US012563254B2

(12) United States Patent
Lee et al.

(10) Patent No.: US 12,563,254 B2
(45) Date of Patent: Feb. 24, 2026

(54) TV AND CONTROL METHOD THEREFOR

(71) Applicant: LG ELECTRONICS INC., Seoul (KR)

(72) Inventors: Jinhee Lee, Seoul (KR); Gowoon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/726,638

(22) PCT Filed: Jan. 4, 2022

(86) PCT No.: PCT/KR2022/000070
§ 371 (c)(1),
(2) Date: Jul. 3, 2024

(87) PCT Pub. No.: WO2023/132375
PCT Pub. Date: Jul. 13, 2023

(65) Prior Publication Data
US 2025/0088701 A1 Mar. 13, 2025

(51) Int. Cl.
| | |
|---|---|
| *H04N 21/431* | (2011.01) |
| *G06V 40/16* | (2022.01) |
| *H04N 21/4223* | (2011.01) |
| *H04N 21/442* | (2011.01) |

(52) U.S. Cl.
CPC ....... *H04N 21/4312* (2013.01); *G06V 40/172* (2022.01); *H04N 21/4223* (2013.01); *H04N 21/44218* (2013.01)

(58) Field of Classification Search
None
See application file for complete search history.

(56) References Cited

U.S. PATENT DOCUMENTS

| | | | |
|---|---|---|---|
| 2008/0130958 A1* | 6/2008 | Ziomek ............... | H03G 3/3005 |
| | | | 382/116 |
| 2013/0061258 A1* | 3/2013 | Takaya ................... | H04H 60/45 |
| | | | 725/10 |
| 2013/0127918 A1* | 5/2013 | Kang .................... | G06F 1/3265 |
| | | | 345/660 |
| 2016/0112667 A1* | 4/2016 | Park ...................... | G06F 3/0346 |
| | | | 348/739 |
| 2017/0034560 A1* | 2/2017 | Garner ............. | H04N 21/43637 |
| 2017/0103735 A1* | 4/2017 | Oh ........................ | G06F 3/0482 |
| 2018/0136950 A1* | 5/2018 | Lefevre ................. | H04H 60/40 |
| 2020/0077138 A1* | 3/2020 | Sawyer ............. | H04N 21/4316 |
| 2020/0213680 A1* | 7/2020 | Ingel .................. | H04N 21/8106 |

(Continued)

FOREIGN PATENT DOCUMENTS

| | | |
|---|---|---|
| KR | 10-2011-0057921 A | 6/2011 |
| KR | 10-2015-0001940 A | 1/2015 |

(Continued)

*Primary Examiner* — Alexander Q Huerta
(74) *Attorney, Agent, or Firm* — Birch, Stewart, Kolasch & Birch, LLP

(57) ABSTRACT

According to one embodiment of the present invention, a method for controlling a TV having a variable size of an exposed screen comprises the steps of: identifying at least one user; changing the size of the exposed screen according to information of the identified user by referring to a memory; and controlling a video displayed on the exposed screen by referring to the memory.

10 Claims, 16 Drawing Sheets

(56)  References Cited

U.S. PATENT DOCUMENTS

| 2022/0013086 A1* | 1/2022 | Yun | ...................... H04N 21/431 |
| 2023/0027714 A1* | 1/2023 | Lee | ...................... G06F 1/1677 |
| 2024/0406341 A1* | 12/2024 | Lee | ................... H04N 21/4415 |
| 2025/0217091 A1* | 7/2025 | Lee | ...................... G06F 1/1677 |

FOREIGN PATENT DOCUMENTS

| KR | 10-2019-0107950 A | 9/2019 |
| KR | 10-2021-0069441 A | 6/2021 |
| KR | 10-2266901 B1 | 6/2021 |

* cited by examiner (a)                      (b)

Let's go back to the beach  Sweep

1411

(b)

1410

1420

1430

(a)

TV AND CONTROL METHOD THEREFOR

CROSS REFERENCE TO RELATED APPLICATIONS

This application is the National Phase of PCT International Application No. PCT/KR2022/000070, filed on Jan. 4, 2022, which is hereby expressly incorporated by reference into the present application.

TECHNICAL FIELD

The technical field of the present disclosure includes various multimedia devices having displays, etc. For example, it is applicable to a Television (TV) having a variable size of an exposed screen.

BACKGROUND ART

In TV according to the related art, an entire area of a screen (screen) is always exposed. However, even when a user does not watch TV, there is a problem that the user may not fully utilize a space when a black screen is always exposed. Meanwhile, a service that uses only a partial area of a screen of a TV as a display is not provided.

In order to solve this problem, research is being conducted on a new form factor of TV.

DISCLOSURE

Technical Tasks

One technical task of the present disclosure is to provide a system that selectively allows a screen to be partially or fully exposed by using a motor or the like added to a TV.

Another technical task of the present disclosure is to provide a customized view mode for each user and adaptively and differently display types or levels of UI and information displayed on a TV screen, using information of a camera, a sensor, and the like installed on a TV.

Another technical task of the present disclosure is to present a solution for optimally controlling an angle of a camera installed on a TV based on a size of an exposed TV screen and user's location information.

Technical Solutions

In one technical aspect of the present disclosure, provided is a method of controlling a TV having a variable size of an exposed screen, the method including identifying at least one user, changing a size of the exposed screen according to information of the identified user by referring to a memory, and controlling a video displayed on the exposed screen by referring to the memory.

In another technical aspect of the present disclosure, provided is a TV having a variable size of an exposed screen, the TV including a memory, a camera identifying at least one user, and a controller configured to change a size of the exposed screen according to information of the identified user and control a video displayed on the exposed screen by referring to the memory.

Advantageous Effects

According to one embodiment of the present disclosure, a system for selectively allowing a screen to be partially or fully exposed using a motor or the like added to a TV is provided.

According to another embodiment of the present disclosure, it has the advantage of providing a customized view mode for each user using information of a camera, a sensor, and the like installed on a TV and adaptively and differently displaying types or levels of UI and information displayed on a TV screen.

According to further embodiment of the present disclosure, there is a technical effect of presenting a solution for optimally controlling an angle of a camera installed on a TV based on a size of an exposed TV screen and user's location information.

DESCRIPTION OF DRAWINGS

FIG. 14 is a diagram illustrating a process for changing a view mode depending on a presence or non-presence of user recognition by a TV according to an embodiment of the present disclosure.

BEST MODE

Figure 1:
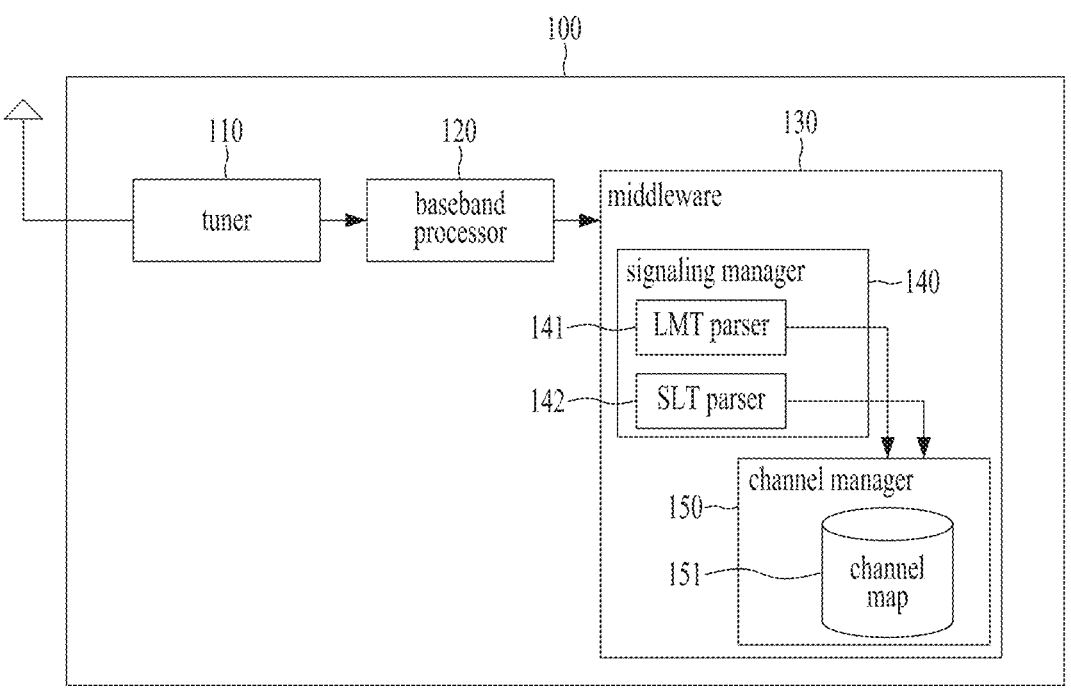
FIG. 1 is a diagram illustrating components inside a TV according to an embodiment of the present disclosure.

FIG. 1 is a diagram illustrating components inside a TV according to an embodiment of the present disclosure.

The present disclosure is applicable to various TV products, for example, the Digital Video Broadcasting (DVB) standard, which is a European standard, the Advanced Television Systems Committee (ATSC) 3.0 standard, which is a North American/Korean standard, etc.

In FIG. 1, a process for a TV 100 to perform and initial service scan operation in accordance with the ATSC 3.0 standard will be illustrated, but the scope of the rights of the present disclosure should be determined according to the matters described in the claims.

A tuner 110 determines whether a signal is present by using a predefined frequency list. If a signal is detected at a given frequency, a baseband processor 120 extracts L1 signaling of a preamble.

Furthermore, the baseband processor 120 transmits Physical Layer Pipe (PLP) data including link layer signaling and Low Level Signaling (LLS) to a middleware 130, and the middleware 130 may extract the link layer signaling and the LLS from the PLP data.

Meanwhile, the middleware 130 includes a signaling manager 140 and a channel manager 150.

The middleware 130 receives the PLP data including the link layer signaling and the LLS from the baseband processor 120 and passes the data to an appropriate parser.

For example, the middleware 130 extracts Link Mapping Table (LMT) from the link layer signaling and passes the LMT to an LMT parser 141. Furthermore, the middleware 130 extracts Service List Table (SLT) from the LLS and passes the SLT to an SLT parser 142.

The LMT parser 141 parses the LMT and extracts first information (e.g., PLPID, session information (IP address and port number), etc.) necessary to generate a channel map.

The SLT parser 142 parses the SLT and extracts second information (e.g., service id, service name, etc.) necessary to generate the channel map.

The extracted first information and second information are stored in a channel map 151.

Figure 2:
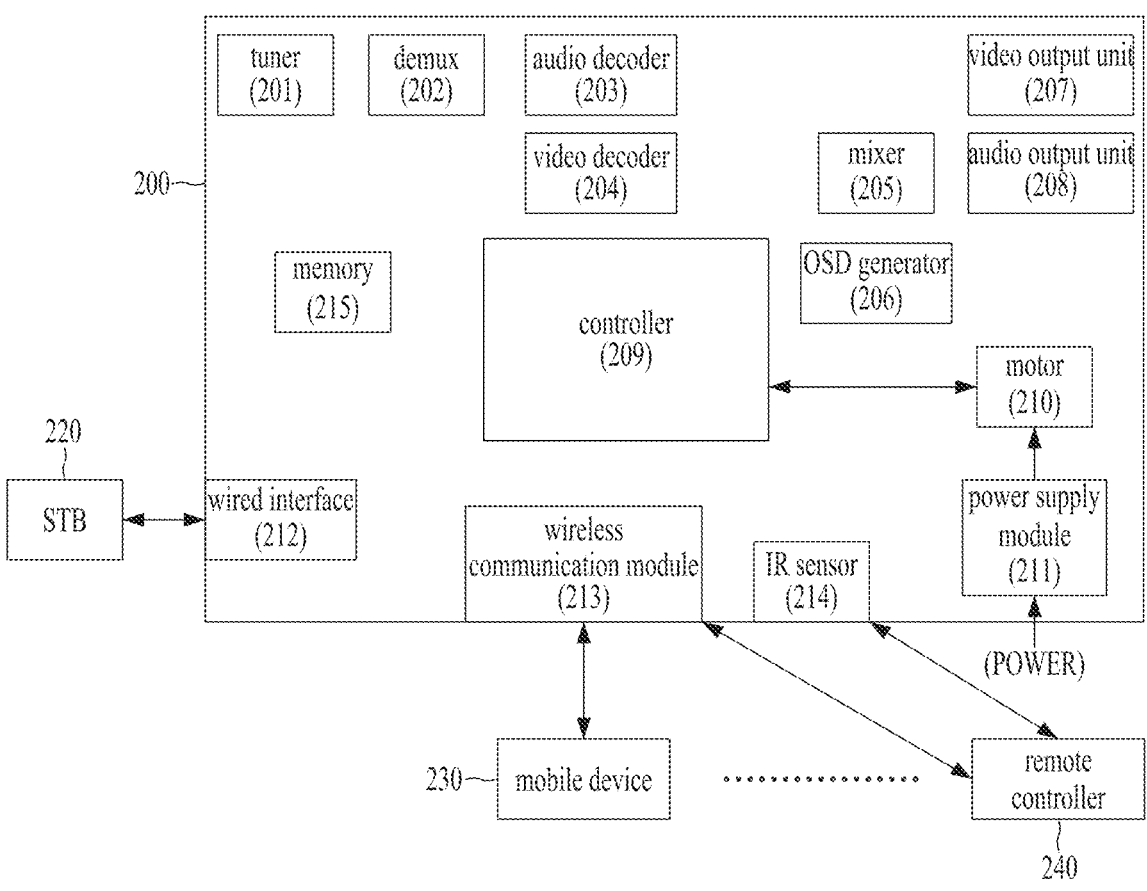
FIG. 2 is a diagram illustrating components inside a TV according to another embodiment of the present disclosure and an external device together.

FIG. 2 shows components inside a TV and an external device according to another embodiment of the present disclosure. Those skilled in the art may implement the present disclosure by combining some components with reference to FIGS. 1 and 2. For example, the baseband processor 120 and the middleware 130 shown in FIG. 1 may be included in a controller 209 shown in FIG. 2.

Although a TV 200 shown in FIG. 2 includes various components, the scope of the rights of the present disclosure is not limited thereto and should be determined according to the matters described in the claims.

Moreover, the components inside the TV 200 shown in FIG. 2 may be controlled through the controller 209, and each of the components may be directly or indirectly connected thereto. That is, although not shown in FIG. 2, all of the components inside the TV 200 of FIG. 2 are designed to directly or indirectly transmit and receive control signals and/or data.

First, a tuner 201 receives a broadcast signal through an antenna or the like, and a demuxer (demux or demultiplexer) 202 demultiplexes audio data and video data included in the broadcast signal.

An audio decoder 203 decodes the audio data (in encoded state) included in the broadcast signal, and a video decoder 204 decodes the video data (in encoded state) included in the broadcast signal.

The decoded audio data is outputted through an audio output unit 207. The audio output unit 207 may be, for example, a speaker attached to or spaced apart from the TV 200.

Meanwhile, the decoded video data is directly outputted through a video output unit 208. Alternatively, a mixer 205 mixes menu data generated by an OSD generating unit 206 and the video data and then transmits the mixed menu data to the video output unit 208.

A memory 215 stores various control data and commands for controlling the TV 200, and the controller 209 may control all components in the TV with reference to the memory 215.

Furthermore, the TV 200 transmits and receives data through communication with various peripheral external devices. For example, video and audio data are received from an STB 220 via a wired interface 212, and then processed by the audio decoder 203 and the video decoder 204, respectively. Alternatively, the received video and audio data may be directly outputted through the audio output unit 207 and the video output unit 208 without passing through the decoders 203 and 204.

Various data is transmitted and received with a mobile device 230 (e.g., a mobile phone, a wearable device, etc.) via a wireless communication module 213, and an infrared (IR) signal of a remote controller 240 is received through an infrared sensor 214. Alternatively, the remote controller 240 capable of Bluetooth communication such as BT transmits and receives various data to and from the TV via the wireless communication module 213.

Unlike the related art TV, the TV 200 according to an embodiment of the present disclosure further includes a motor 210 inside or outside the TV 200. Therefore, it becomes possible to freely control an exposed area of a screen of the TV 200 using the motor 210 (more specific embodiments related to this will be described in detail in FIGS. 3 to 6 below). On the other hand, the related art TV has a problem in that a full screen of the same size is always exposed.

According to an embodiment of the present disclosure, unlike the related art, since power needs to be additionally supplied to the motor 210 through a power supply module 211, a technology that minimizes power consumption by optimizing the control of the motor is important. And, it is required as a very important interface technology to specifically define what kind of information is supposed to be displayed depending on an exposed area of a TV screen. As mentioned above, the related art TV does not need to review the above technical requirements because a full screen of the same size is always exposed.

Figure 3:
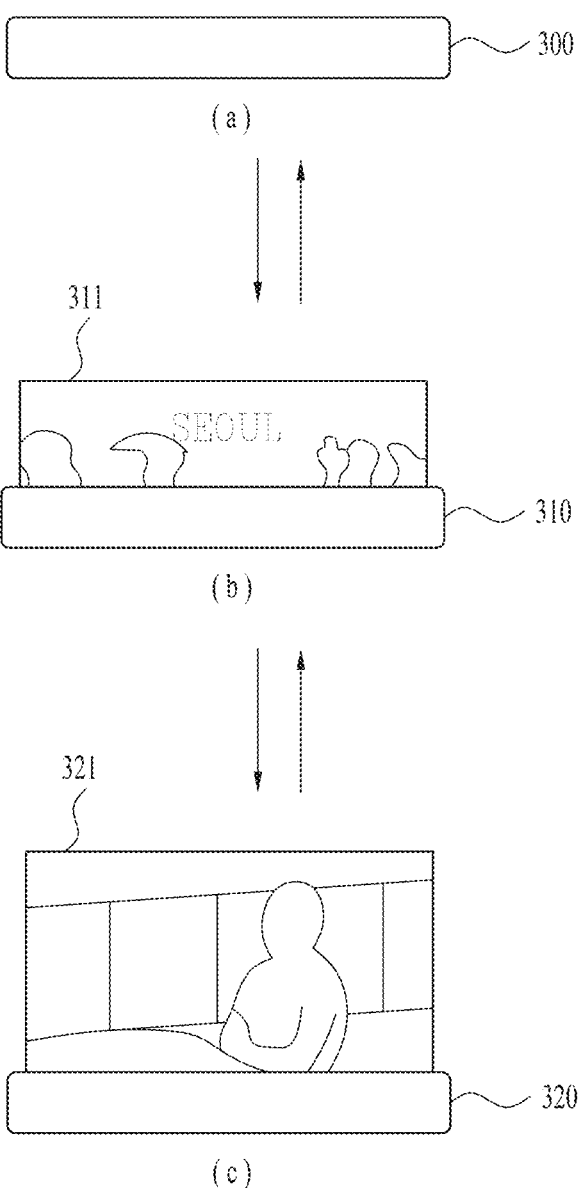
FIG. 3 is a diagram illustrating an exterior of a TV according to an embodiment of the present disclosure.

FIG. 3 illustrates an exterior of a TV according to an embodiment of the present disclosure.

Unlike the related art, the screen of the TV according to an embodiment of the present disclosure may be included in the housing 300, as shown in (a) of FIG. 3. When a certain condition is satisfied (for example, when a signal pressing a power button of a remote controller once is input), as shown in (b) of FIG. 3, only a partial screen 311 of the TV may be exposed from the housing 310. When another certain condition is satisfied (for example, when a signal pressing the power button of the remote controller twice is input), as illustrated in (c) of FIG. 3, an entire screen 321 of the TV may be designed to be exposed from the housing 320. Needless to say, a mode in (c) of FIG. 3 may be switched to a mode in (b) and a mode in (a) in a reverse direction, and the mode in (b) may be skipped.

To implement this, the screen 321 of the TV may include a material for forming a flexible display. For example, a bendable or rollable flexible display material may be for a plastic OLED (POLED or P-OLED), and may be finished with a colorless polyimide (CPI) film, which is a plastic material. Here, the CPI film is for a transparent but rigid plastic material like glass, may freely change a shape, and may not easily break even a pressure is applied.

The screen 321 may be wound around rollers inside the housing 320 and then unfolded, and a motor for driving the rollers may be required. This will be described below in more detail with reference to FIG. 6.

To be distinguished from the related art, a TV designed as shown in FIG. 3 may be defined as a rollable TV or a flexible TV, a mode illustrated in (a) of FIG. 3 may be defined as a zero view, a mode illustrated in (b) of FIG. 3 may be defined as a partial view; and a mode illustrated in (c) of FIG. 3 may be defined as a full view.

Figure 4:
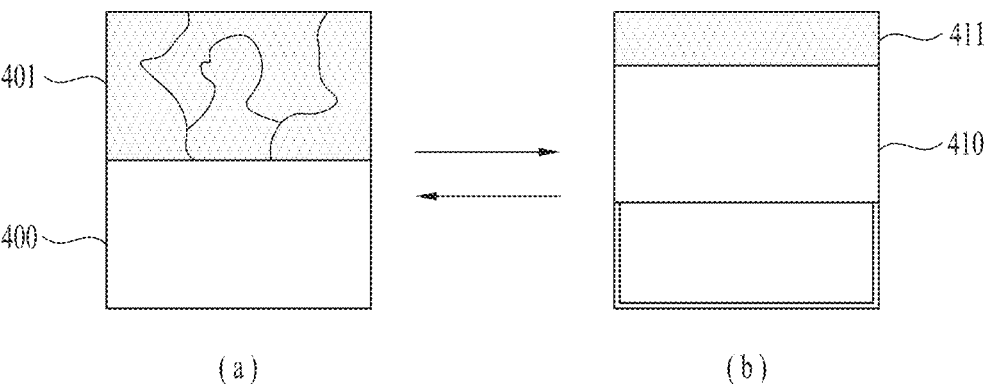
FIG. 4 is a diagram illustrating an exterior of a TV according to another embodiment of the present disclosure.

FIG. 4 is a diagram illustrating an exterior of a TV according to another embodiment of the present disclosure.

Although it has been described with reference to FIG. 3 that a flexible display material is used for a screen of the TV, the TV may not necessarily include a material for a flexible display, and a screen of a general TV may be used without change in the embodiment of FIG. 4.

However, differently from the related art, as shown in (a) of FIG. 4, covers 400 having the same size or similar sizes may be positioned under the screen 401 of the TV. When a certain condition is satisfied (for example, when a signal pressing a power button of a remote controller once is input), as shown in (b) of FIG. 4, a cover 410 may be designed to move in an up direction to expose only a partial TV screen 411. Needless to say, a mode in (a) of FIG. 4 may be switched to a mode shown in (a) of FIG. 4. To freely move the cover shown in FIG. 4 in an up/down direction, a motor may be designed to be positioned around the cover.

To be distinguished from the related art, the TV designed as shown in FIG. 4 may be defined as an Atelier TV, a mode illustrated in (a) of FIG. 4 may be defined as a full view; and a mode illustrated in (b) of FIG. 4 may be defined as a line view or a partial view.

Figure 5:
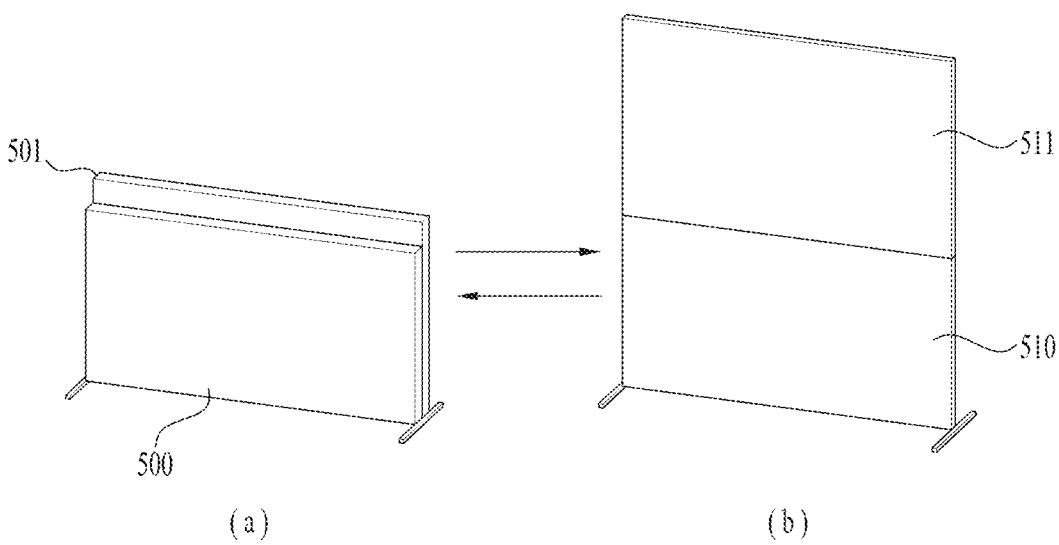
FIG. 5 is a diagram illustrating an exterior of a TV according to further embodiment of the present disclosure.

FIG. 5 is a diagram illustrating an exterior of a TV according to further embodiment of the present disclosure.

Similar to FIG. 4, a material for a flexible display may not necessarily be used as a TV screen, and a general display may be used without change. However, differently from FIG. 4, the TV screen other than a cover itself is moved.

For example, as shown in (a) of FIG. 5, the cover 500 having the same size or similar sizes is designed to be positioned under the TV screen 501. The TV screen 501 and the cover 500 may be apart from each other at a certain interval to prevent friction from being generated. When a certain condition is satisfied (for example, when a signal pressing a power button of the remote controller once is input), as illustrated in (b) of FIG. 5, the TV screen 511 may move in an up direction to design the entire TV screen 511 to be exposed. In this case, differently from FIG. 4, a cover 510 may not move.

Needless to say, in a mode of (b) of FIG. 5 may be switched to a mode of (a) of FIG. 5. To freely move the TV screen shown in FIG. 5 in an up/down direction, a motor may be designed around the TV screen To be distinguished from the related art, a TV designed as shown in FIG. 5 may be defined as an interior TV, a mode illustrated in (a) of FIG. 5 may be defined as a partial view or a line view, and a mode illustrated in (b) of FIG. 5 may be defined as a full view.

Figure 6:
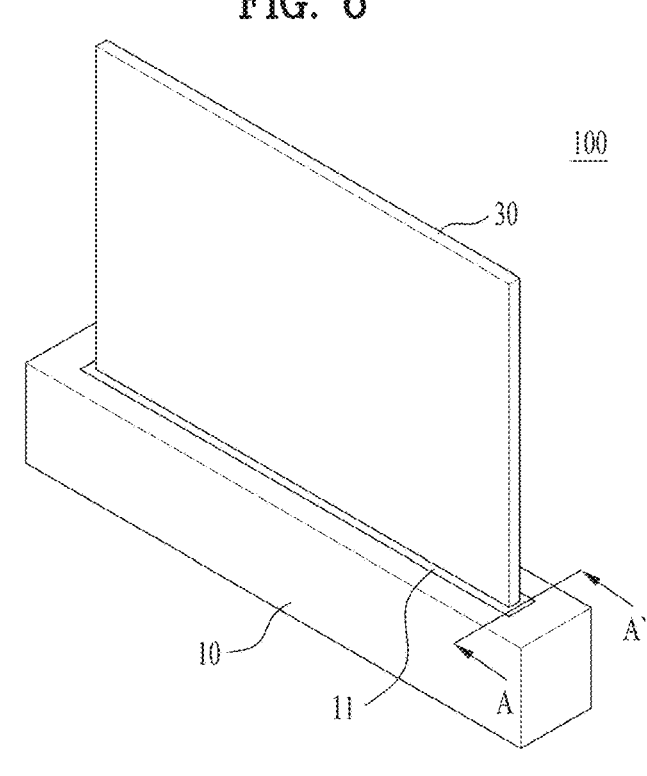
FIG. 6 is a diagram illustrating a motor for adjusting a screen size of a TV according to an embodiment of the present disclosure.
Figure 6:
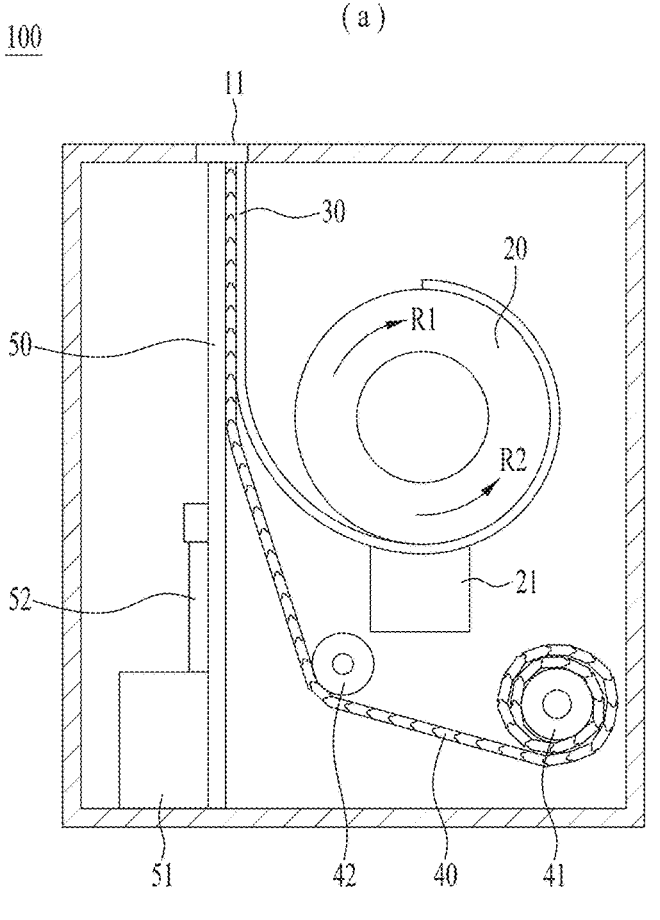

FIG. 6 is a diagram for explaining a motor for adjusting a screen size of a TV according to an embodiment of the present disclosure.

Although the motor is applicable to the embodiments of FIGS. 4 and 5, it is assumed that the motor is applied to the TV of FIG. 3 for convenience of description, and FIG. 6 will be described.

(a) of FIG. 6 illustrates a screen of the housing and the TV screen shown in FIG. 3 in a diagonal direction. (b) of FIG. 6 is a cross-sectional view taken along a line A-A' of (a) of FIG. 6.

As shown in (a) of FIG. 6, the TV system 100 may further include the housing 10.

The housing 10 may be configured to accommodate various components, and more particularly, the housing 10 may accommodate, for example, the screen 30 and various electronic components for operating the screen 30.

As shown in (b) of FIG. 6, the TV system 100 may include the roller 20 rotatably installed in the housing 10. Although not shown, the roller 20 may include sleeves formed at both ends, and the sleeves may be rotatably supported with respect to the housing 10 by bearings.

The roller 20 may be connected to the motor 21 installed in the housing 10, and may rotate in a clockwise direction R1 or a counterclockwise direction R2 as illustrated by the motor 21. To adjust a rotation speed of the roller 20, a gear train may be located between the motor 21 and the roller 20.

The TV system 100 may include the screen 30 configured to display various contents and information related to the contents. For example, the screen 30 may display video content, audio content, and other ancillary content. Such contents include various pieces of information associated thereto, for example, a playback time in a video content, a title of the content, and the like, and the display 30 may also display such relevant information.

The screen 30 may be accommodated in the housing 10 as illustrated in such a manner that the TV system 100 may have a compact structure. To accommodate the screen 30 in the housing 10, the screen 30 needs to be basically deformed. Accordingly, the TV system 100 may use a flexible display as the screen 30.

Due to this deformable property, as shown in (b) of FIG. 6, the screen 30 may be rolled on the roller 20. The screen 30 may be wound around the roller 20 or unwound from the roller 20 according to a rotation direction of the roller 20. The screen 30 may be unwound from the roller 20 and project or roll out to the outside of the housing 10. On the contrary, the screen 30 may be wound around the roller 20 to retract/roll in the housing 10. In detail, as shown in (b) of FIG. 6, when the roller 20 rotates in a clockwise direction R1, the screen 30 may be unwound from the roller 20 and be expanded to the outside of the housing 10 through an opening 11 formed in the housing 10.

Therefore, as described above, a screen accommodated in the housing 300 in (a) of FIG. 3 may be extended to the outside of the housing 310 as shown in (b) of FIG. 3, and a screen 311 having a certain size may be formed. When the roller 20 further rotates in the clockwise direction R1, the screen 30 may be further unwound from the roller 20. Therefore, as shown in (c) of FIG. 3, the screen may protrude to a larger size outside the housing 10, and may form a screen of a larger size. When the roller 20 rotates in the counterclockwise direction R1, the screen 30 may be wound around the roller 20 and may be contracted into the housing 10 through the opening 11. Accordingly, as shown in (b) of FIG. 3, the screen 321 of (c) of FIG. 3 may be contracted to have a relatively smaller size inside the housing 310, thereby forming a smaller screen. When the roller 20 further rotates counterclockwise R2, the screen 30 may be further wound around the roller 20. Therefore, as shown in (a) of FIG. 3, the screen may not protrude to the outside of the housing 300, and may be completely accommodated in the housing 300.

A front portion of the screen 30, which is expanded from the TV system 100, may be protected by the window, while a rear portion of the screen 30 may be exposed. The screen 30 includes sensitive electronic components and substrates, and thus the screen 30 needs to be properly protected to prevent malfunction. Accordingly, as illustrated in (b) of FIG. 6, the TV system 100 may include the cover 40 configured to cover the rear portion of the extended screen 30.

The cover 40 may include a plurality of links connected to each other. The link may have a width corresponding to a width of the screen 30, and the links connected to each other, that is, the cover 40, may form a single plate covering the rear portion of the screen 30. Any one of the links is pivotable with respect to another adjacent link, and thus as shown in the drawing, the cover 40 may be wound around a first roller 41 and may be guided to a rear side of the screen 30 by the second roller 42.

When the screen 30 is expanded during an operation of the TV system 100, the first roller 41 may rotate to unwind the cover 40. The unwound cover 40 is guided by the second roller 41 and is attached to the rear portion of the screen 30. Accordingly, the cover 40 may be extended to the outside of the housing 10 together with the screen 30 to protect the rear portion of the screen 30.

When the screen 30 is contracted, the first roller 41 may rotate in an opposite direction to separate the cover 40 from the screen 30, and the separated cover 40 may be guided by the second roller 42 to be wound around the first roller 41. In the cover 40, the first roller 41 may be driven by the motor 21 together with the roller 20, and a separate motor for driving the first roller 41 may be installed in the housing 10.

The screen 30 may be difficult to maintain an expanded state due to the flexibility thereof. Accordingly, the TV system 100 may include the supporter 50 configured to support the extended screen 30. The supporter 50 may be extended to the outside of the housing 10 through the opening 11 by the motor 51 and the auxiliary supporter 52 connected thereto. Accordingly, the supporter 50 may be extended to the outside of the housing 10 together with the screen 30. Accordingly, the screen 30 expanded by the supporter 50 may be stably supported to display content to the user.

Figure 7:
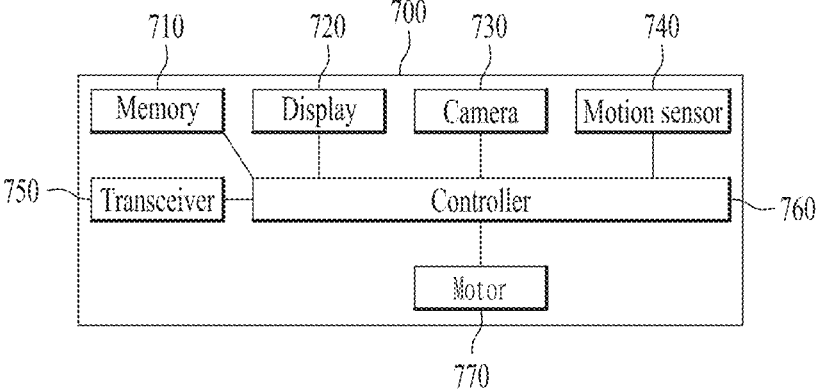
FIG. 7 is a block diagram illustrating main components in a TV according to an embodiment of the present disclosure.

FIG. 7 is a block diagram showing main components inside a TV according to an embodiment of the present disclosure. In a TV 700 shown in FIG. 7, as described above in FIGS. 3 to 6, a size of an exposed screen varies. Those skilled in the art may supplementally analyze the TV 700 shown in FIG. 7 with reference to the previous drawings.

As shown in FIG. 7, a TV 700 according to an embodiment of the present disclosure includes a memory 710, a display 720, a camera 730, a motion sensor 740, a transceiver 750, a controller 760, and a motor 770. Yet, those skilled in the art may delete, add, or change some components as necessary, and the scope of rights of the present disclosure should be determined according to the matters described in the claims.

The memory 710 stores various commands for controlling the TV 700.

The display 720 is designed to output video data received through a broadcasting station, STB, Internet, etc. In particular, it is designed so that an exposed size of the display 720 varies under the control of the motor 770.

The camera 730 identifies at least one user located around the TV 700, and the motion sensor 740 detects whether the user moves.

The transceiver 750 performs wireless communication with a mobile device (e.g., a smartphone) located around the TV 700.

In addition, the controller 760 performs a function of generally controlling the respective components described above.

In particular, the controller 760 changes a size of an exposed screen (e.g., the display 720) according to information of a user identified by the camera 730 or the like by referring to the memory 710. Furthermore, the controller 760 controls a video displayed on the exposed screen (e.g., the display 720) in various ways according to the information of the user identified by the camera 730 or the like by referring to the memory 710. Detailed embodiments related to this will be described in FIG. 11 and FIG. 12 below.

Furthermore, the controller 760 may additionally use identification information received from a mobile device wirelessly connected to the TV 700 via the transceiver 750. A more specific embodiment related to this will be described in FIG. 10 below.

In addition, the controller 760 increases a size of a text included in a video in proportion to age information of the identified user. A more specific embodiment related to this will be described in FIG. 12 (d) below.

For example, if a first condition in which a motion change of a user around the TV is not detected for a preset time or more (e.g., 1~2 minutes) by the motion sensor 740 and a second condition in which a pupil of the user around the TV is not detected for the preset time by the camera 730 are satisfied, the controller 760 is designed to change a size of an exposed e TV screen to a minimum value and gradually reduce an output of audio data. A more specific embodiment related to this will be described in more detail in FIG. 15 below.

Furthermore, the controller 760 primarily adjusts the camera 730 within a first range according to the size of the exposed screen and secondarily adjusts the camera 730 within a second range according to a position of the user identified by the motion sensor 740 or the like. In particular, the first range described above is designed to be larger than the second range. A more specific embodiment related to this will be described in FIG. 16 below.

Figure 8:
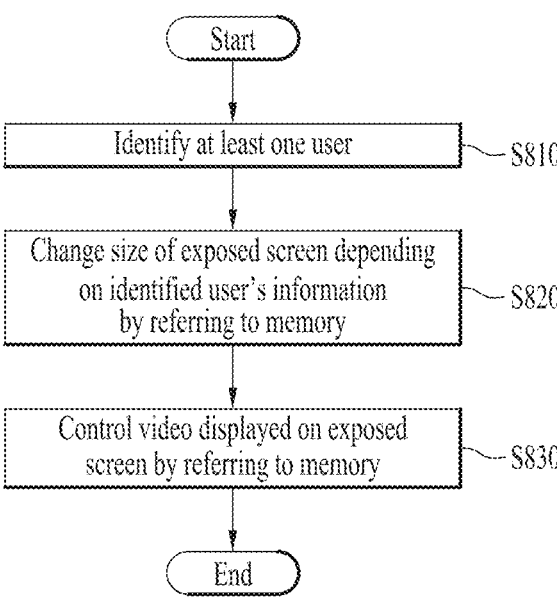
FIG. 8 is a flowchart illustrating a method of controlling a TV in time series according to an embodiment of the present disclosure.

FIG. 8 is a flowchart illustrating a method of controlling a TV in time series, according to an embodiment of the present disclosure.

As shown in FIG. 8, a TV according to an embodiment of the present disclosure identifies at least one user (S810), and changes a size of an exposed screen according to information of the identified user by referring to the memory (S820).

Meanwhile, the step S810 shown in FIG. 8 is designed to use, more specifically, identification information received from a mobile device connected wirelessly to the TV or face recognition information detected through a camera installed in the TV. In this regard, a detailed embodiment will be described in FIG. 10 below:

Furthermore, the TV is designed to control a video displayed on the exposed screen by referring to the memory (S830). Accordingly, different information is displayed in a different view mode for each user located around the TV. In this regard, a detailed embodiment will be described with reference to FIG. 11 to FIG. 12.

Figure 9:
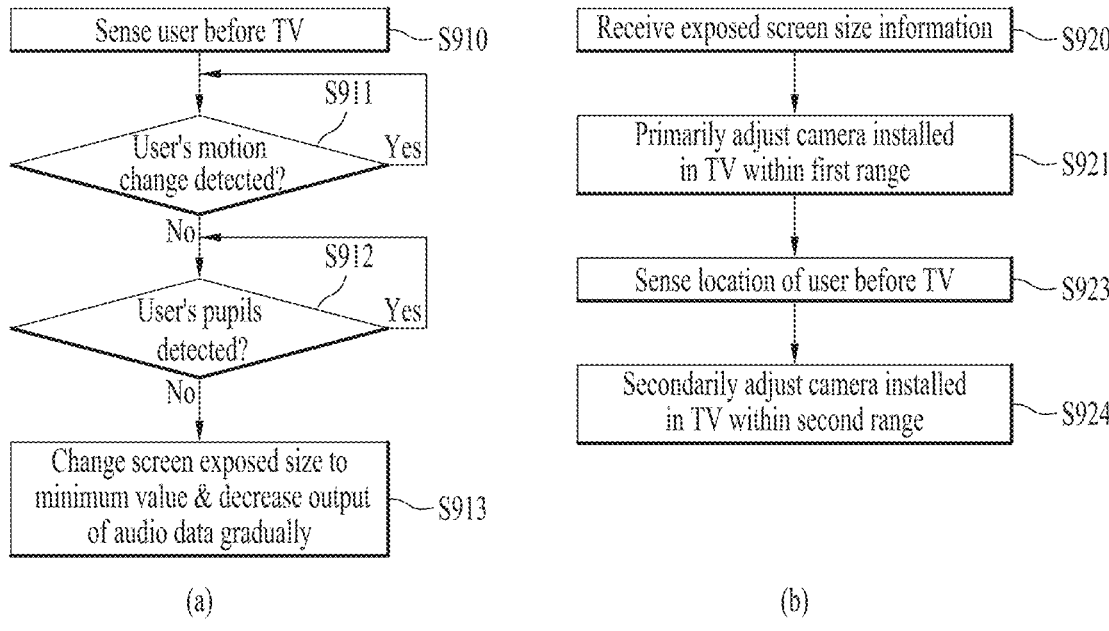
FIG. 9 is a flowchart illustrating a method of controlling a TV in time series according to another embodiment of the present disclosure.

FIG. 9 is a flowchart illustrating a method of controlling a TV in time series according to another embodiment of the present disclosure.

First, as shown in FIG. 9 (*a*), it is assumed that a TV senses a presence of a user around the TV using a motion sensor or the like (S910).

Furthermore, the TV determines whether there is a change in a user's motion for more than a preset time (e.g., 8~10 minutes) (S911).

As a result of the determination (S911), when there is no change in the user's motion, the TV determines whether user's pupils are detected (S912).

As a result of the determination (S912), when the user's pupils are not detected, the TV is designed to change a size of an exposed screen to a minimum value and gradually reduce an output of audio data (S913).

An embodiment related to FIG. 9 (*a*) described above will be described in more detail below with reference to FIG. 15.

First, as shown in FIG. 9 (*b*), it is assumed that a controller of the TV receives exposed screen size information (S920).

Furthermore, the TV primarily adjusts a camera installed in the TV within a first range according to the size of the exposed screen (S921).

Then, the TV is designed to detect a position of a surrounding user using a motion sensor or the like (S923). Finally, the TV secondarily adjusts the camera installed in the TV within a second range according to a position of an identified user (S924). In particular, according to another embodiment of the present disclosure, it is characterized in that the second range in the step S924 is designed to be smaller than the first range in the step S921.

An embodiment related to FIG. 9 (*b*) described above will be described in more detail below with reference to FIG. 16.

Figure 10:
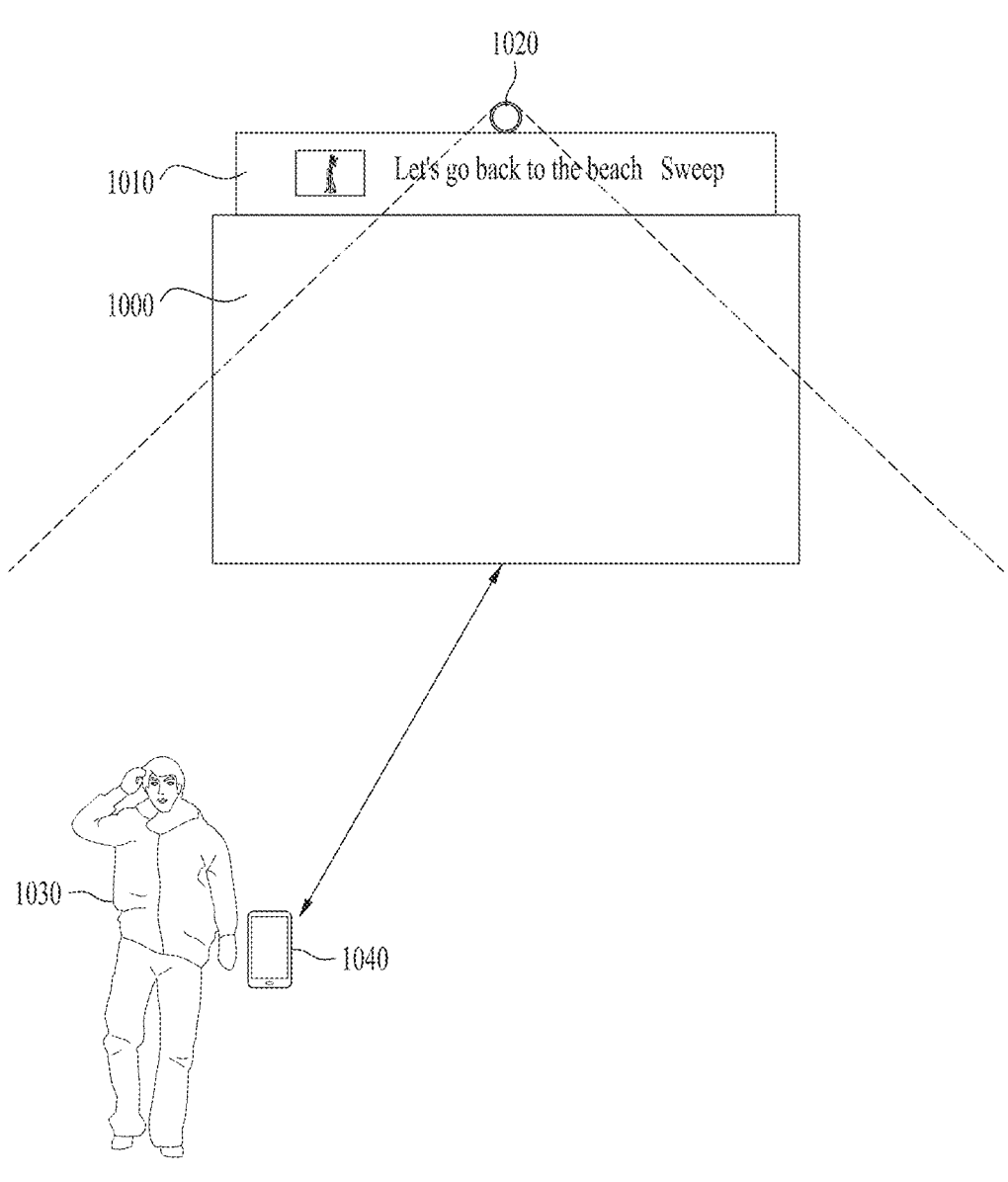
FIG. 10 is a diagram illustrating a process for identifying a surrounding user by a TV according to an embodiment of the present disclosure.

FIG. 10 is a diagram illustrating a process for a TV identify a surrounding user according to an embodiment of the present disclosure.

As shown in FIG. 10, a TV according to an embodiment of the present disclosure is designed to include a fixed cover 1000 and have a screen 1010 exposed outside the cover 1000 while a size of the screen 1010 varies.

Furthermore, for example, by installing a camera 1020 at a top end of the screen 1010, it is designed to identify a user 1030 located around the TV. A size of the screen 1010 automatically varies according to the identified user 1030. Therefore, there is an advantage in that the user does not need to manually change a view mode (e.g., a full mode in which the screen is fully exposed, a partial mode in which the screen is partially exposed, or a zero mode in which the screen is not exposed at all) separately.

Of course, as another embodiment, it is also possible to identify a user around the TV in another way without using the camera 1020. For example, the TV identifies a user through wireless communication with a mobile device 1040 possessed by the user.

Figure 11:
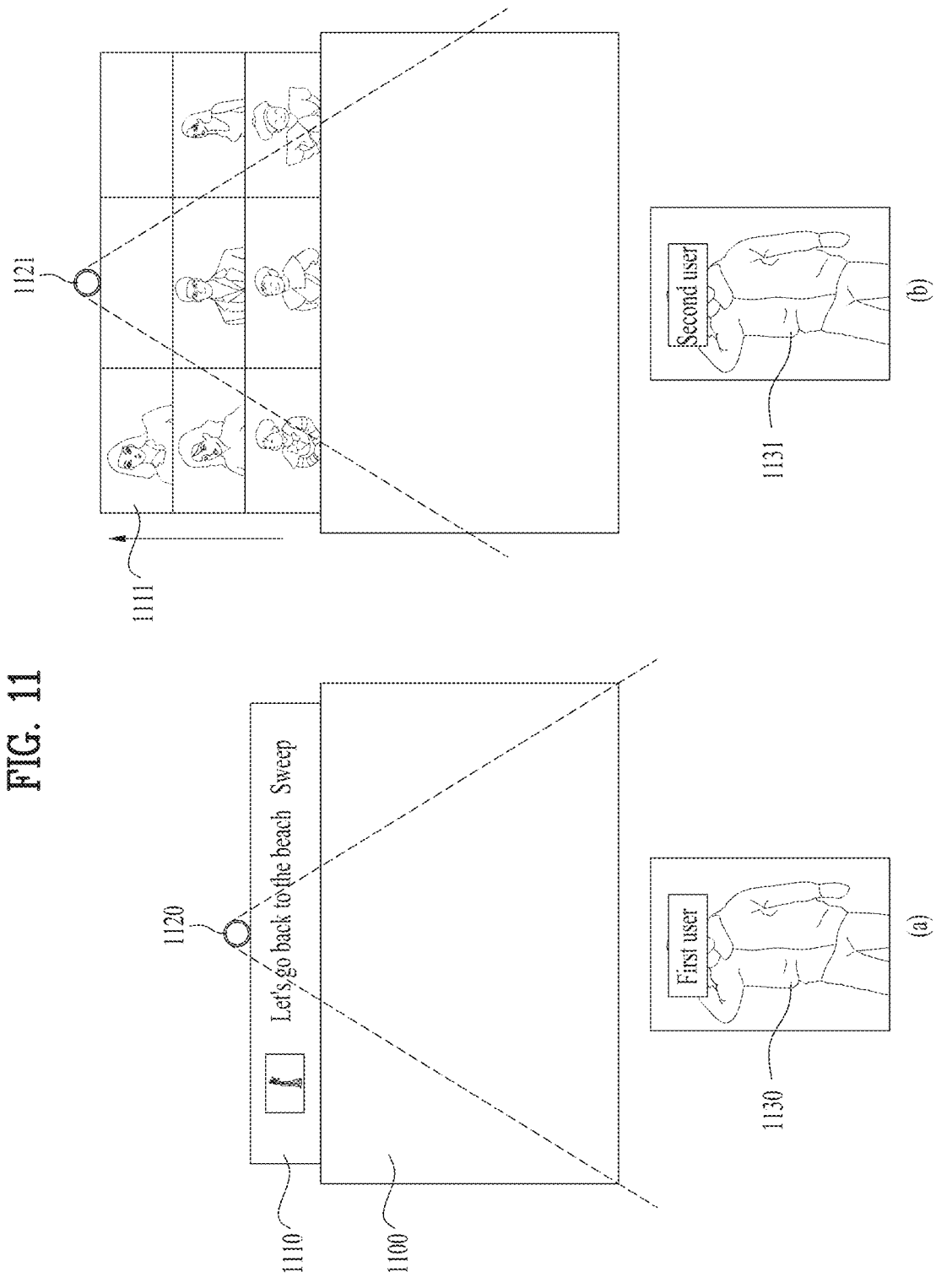
FIG. 11 is a diagram illustrating a process for providing a different view mode for each identified user by a TV according to an embodiment of the present disclosure.

FIG. 11 illustrates a process for providing a different view mode for each identified user by a TV according to an embodiment of the present disclosure As shown in FIG. 11 (*a*), it is assumed that a camera 1120 attached to a TV according to an embodiment of the present disclosure identifies a first user 1130.

On the other hand, the TV refers to a memory to recognize that a percentage of using a content by the first user 1130 in a state where a screen is partially exposed only (which may be referred to as a partial mode) exceeds 50% of a total TV usage time.

Therefore, as shown in FIG. 11 (*a*), it is designed so that only a portion of the screen 1110 of the TV according to an embodiment of the present disclosure is automatically exposed outside a cover 1100. In case of this design, it is advantageous in that the first user 1130 does not need to separately adjust a level of exposing TV screen.

On the other hand, as shown in FIG. 11 (*b*), it is assumed that a camera 1121 attached to a TV according to an embodiment of the present disclosure identifies a second user 1131.

Meanwhile, the TV refers to the memory to recognize that a percentage of using a content by the second user 1131 in a state where a screen is fully exposed (which may be referred to as a full mode) exceeds 50% of a total TV usage time.

Therefore, as shown in FIG. 11 (*b*), an entire screen 1111 of the TV according to an embodiment of the present disclosure is designed to be automatically exposed outside the cover. When designing in this way, it is advantageous in that the second user 1131 also does not need to separately adjust the level of exposing the TV screen.

Figure 12:
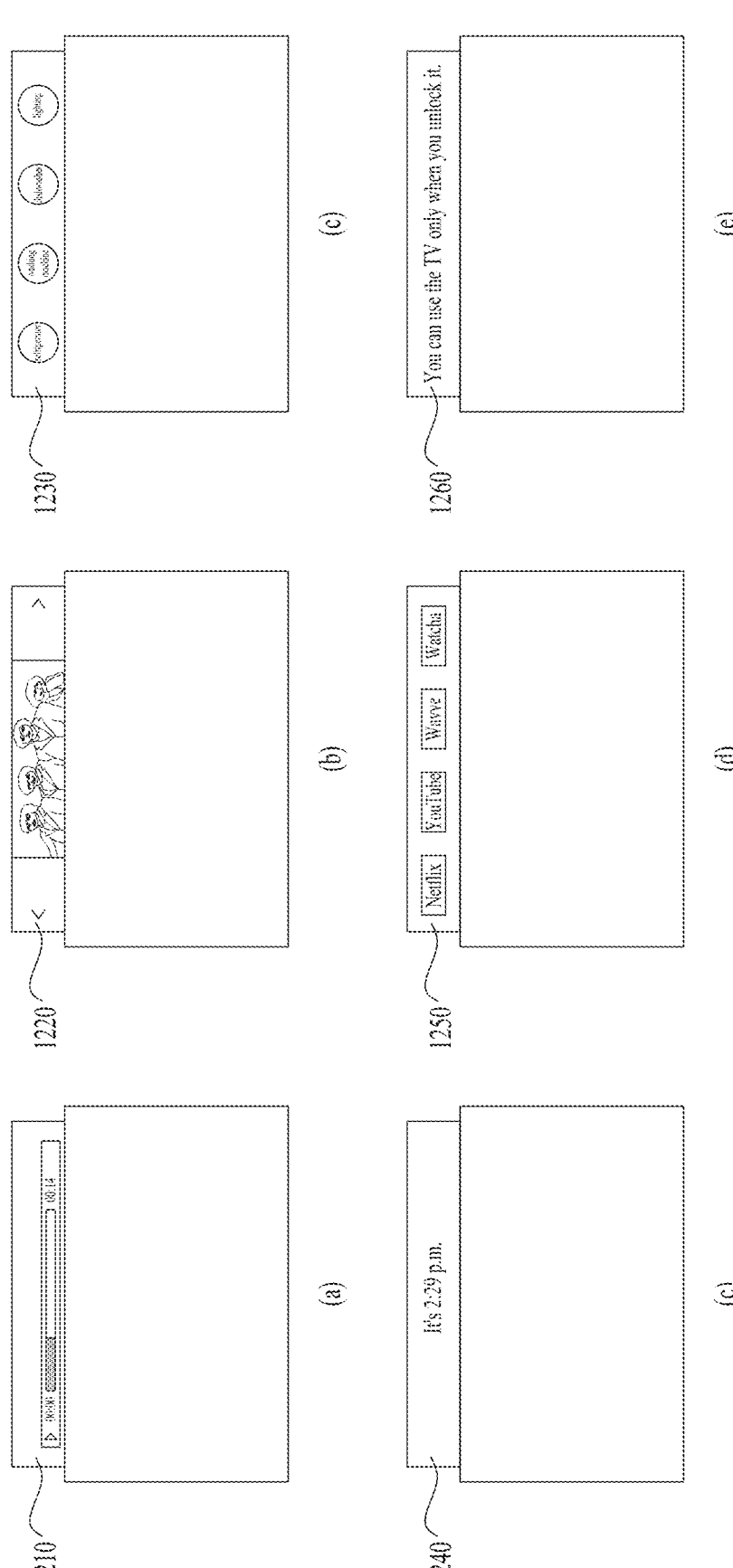
FIG. 12 is a diagram illustrating a process for providing a different UI for each user while maintaining the same view mode by a TV according to an embodiment of the present disclosure.

FIG. 12 illustrates a process for providing a different UI for each user by a TV while maintaining the same view mode according to an embodiment of the present disclosure.

In FIG. 11, the embodiment for automatically providing a different view mode for each user has been described. On the other hand, a TV according to another embodiment of the present disclosure is designed to store information on which service is used the most for each view mode in a memory as well as information on which view mode is used the most in relation to user's TV usage history.

For example, it is assumed that a history in which a user A has used a music content the most in a partial mode is stored in a memory of a TV. When the TV according to an embodiment of the present disclosure recognizes the user A by using a camera or the like, after automatically entering the partial mode, as shown in FIG. 12 (*a*), information related to the music content that the user A hears the most is displayed on a screen 1210. And, the corresponding music is automatically played through a speaker of the TV.

For example, it is assumed that a history in which a user B has used a video content the most in a partial mode is stored in a memory of a TV. When the TV according to an embodiment of the present disclosure recognizes the user B by using a camera or the like, after automatically entering the partial mode, as shown in FIG. 12 (*c*), a video content of the genre that the user B viewed the most is automatically displayed on a screen 1220.

For example, it is assumed that a history in which a user C has controlled other external devices in a house in a partial mode is stored in a memory of a TV. When the TV according to an embodiment of the present disclosure recognizes the user C using a camera or the like, after automatically entering the partial mode, as shown in FIG. 12 (*c*), a list of other external devices currently connected to the TV is automatically displayed on a screen 1230.

For example, if a TV according to an embodiment of the present disclosure recognizes a surrounding user and the recognized user is over a predetermined age (e.g., 60, 65, or 70 years old) or more, it is designed to automatically convert to a text of a large font on a screen 1240) in a partial mode, as shown in FIG. 12 (*d*).

For example, it is assumed that a history in which a user D has used only applications of a specific group in a partial mode is stored in a memory of a TV. When the TV according to an embodiment of the present disclosure recognizes the user D by using a camera or the like, after automatically entering the partial mode, as shown in FIG. 12 (*e*), a list of applications of a specific group most used by the user D is automatically displayed on a screen 1250.

For example, if a TV according to an embodiment of the present disclosure recognizes a surrounding user and the recognized user is under a predetermined age (e.g., 10, 15, or 19 years old), a guide message indicating that the TV can be used normally only when unlocked is outputted to a screen 1260 in the partial mode, as shown in FIG. 12 (f).

In particular, the embodiment illustrated in FIG. 12 (f) is an embodiment for protecting children, and an embodiment for additionally protecting children through other solutions will be described with reference to FIG. 13.

Figure 13:
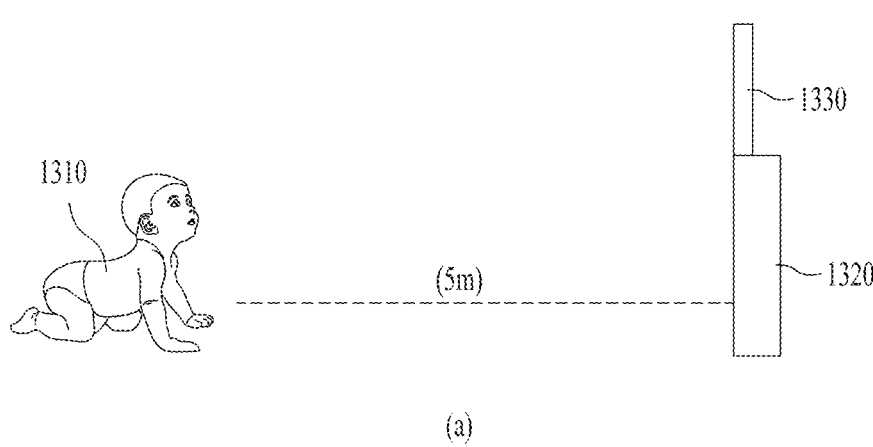
FIG. 13 is a diagram illustrating a process for changing a view mode depending on a distance between an identified user and a TV by the TV according to an embodiment of the present disclosure.
Figure 13:
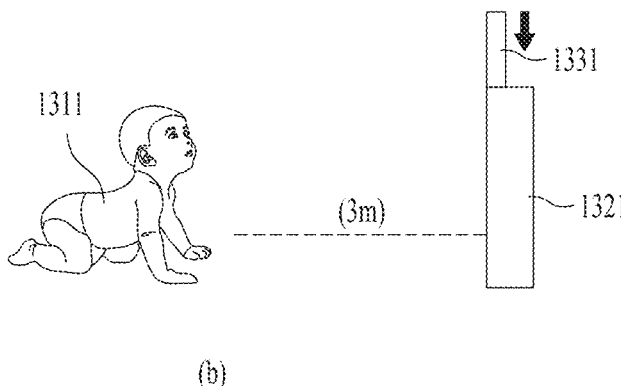

FIG. 13 illustrates a process for changing a view mode by a TV depending on a distance between an identified user and the TV according to an embodiment of the present disclosure.

As shown in FIG. 13 (a), a TV according to an embodiment of the present disclosure assumes that a screen 1330 is fully exposed outside a cover 1320.

Since a user 1310 identified using a camera of the TV is spaced apart by a predetermined distance (e.g., 5 m) or more, there is no need to reduce a size of the screen 1330 exposed.

On the other hand, as shown in FIG. 13 (b), when a user 1311 recognized by a camera or the like of the TV is located 3 m away within a reference distance (e.g., 5 m), a portion of a screen 1331 is retracted into a cover 1321. Accordingly, it is able to fundamentally resolve a side effect that eyesight of a user being too close to the TV is deteriorated. In particular, it is another scope of rights of the present disclosure to apply the embodiment of FIG. 13 only to children through analysis of user's face/body shape and the like using the camera of the TV and to exclude the embodiment of FIG. 13 for adults.

Figure 14:
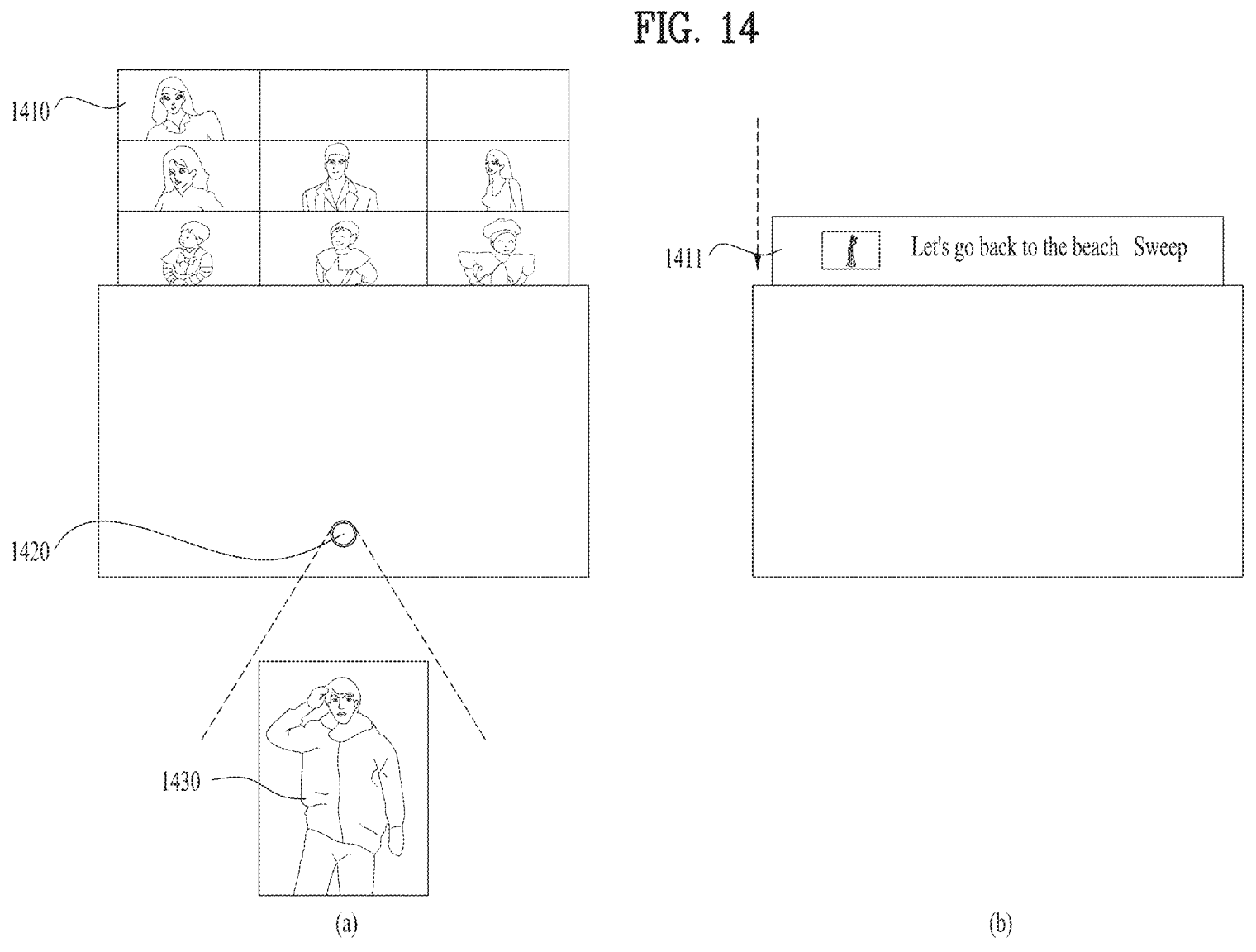

FIG. 14 illustrates a process for changing a view mode depending on whether a TV recognizes a user according to an embodiment of the present disclosure.

In FIG. 13, a view mode is automatically changed (i.e., a size of an exposed screen) according to whether a user (particularly, a child) approaches a TV. Yet, FIG. 14 described below relates to an embodiment of automatically changing a view mode depending on whether a user is recognized around a TV or deviates from the TV.

As illustrated in FIG. 14 (a), it is assumed that a user 1430 is recognized by a motion sensor 1420. It is assumed that a history of using a full view mode more often than a partial view mode by the recognized user 1430 in the entire TV usage time is stored in a memory of a TV. Therefore, as illustrated in FIG. 14 (a), the TV automatically and fully exposes a screen 1410 outside a cover.

Yet, when the user 1430 leaves the TV without watching it anymore, whether the user 1430 leaves the TV may be detected through the motion sensor 1420.

In this case, as shown in FIG. 14 (b), a size of the exposed screen 1411 is automatically minimized. Alternatively, by designing the screen not to be exposed at all, it is possible to omit a video data processing process and consequently reduce unnecessary power consumption. In particular, since the TV to which the present disclosure is applied adjusts the size of the exposed screen through the motor, it is very important to reduce unnecessary power consumption.

Figure 15:
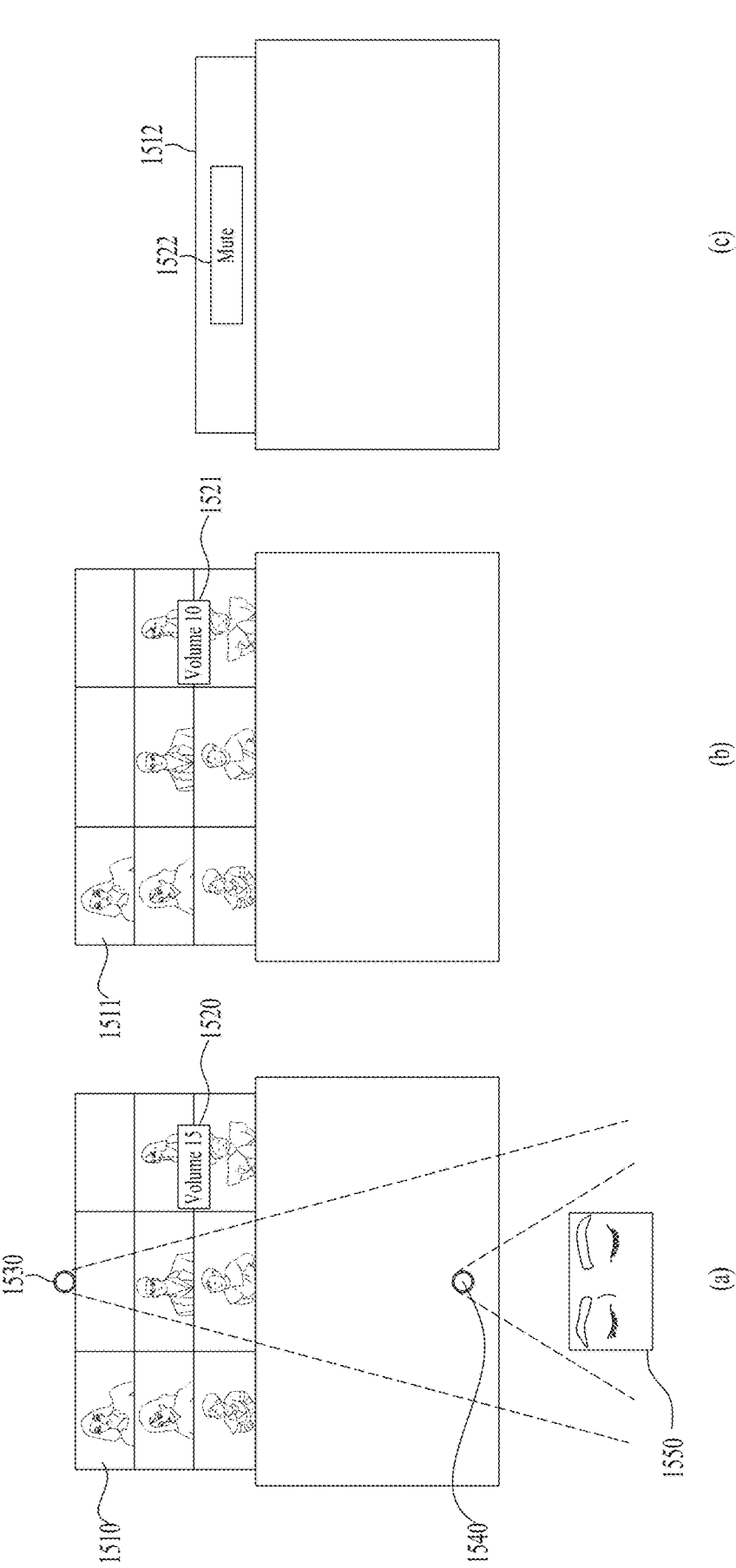
FIG. 15 is a diagram illustrating a process for adjusting a view mode and audio based on specific feature information within a user face by a TV according to an embodiment of the present disclosure.

FIG. 15 is a diagram showing a process for adjusting a view mode and audio by a TV based on specific feature information in a user's face according to an embodiment of the present disclosure.

In the previous FIG. 14, only whether the user around the TV left or not was mainly sensed. Yet, FIG. 15 described below relates to an embodiment for automatically filtering a case in which it is not necessary to provide a video on a full screen even though a user is still located around a TV.

As shown in FIG. 15 (a), it is assumed that a user 1550 is detected using a camera 1530 and a motion sensor 1540 of a TV according to an embodiment of the present disclosure. By referring to a memory, it is designed to enter a view mode most frequently used by an identified user (i.e., to maximize an exposed size of a screen 1510) and automatically output audio at a most frequently used volume level 1520.

Furthermore, if pupils of a user 1550 are not detected for a predetermined time (e.g., 8~10 minutes) or longer as a result of monitoring through the camera 1530 installed in the TV, a size of a screen 1511 remains the same, as shown in FIG. 15 (b), but a volume level 1521 is automatically reduced by ⅓ compared to the previous one. Adjusting a screen size immediately after recognizing a user estimated to be sleeping may not be suitable for user's intention, thereby causing a problem of unnecessarily and frequently controlling a motor. To solve this problem, the intermediate step shown in FIG. 15 (b) is intentionally added.

Finally, as a result of monitoring through the camera 1530 installed in the TV, if the pupils of the user 1550 are not detected for a predetermined time (e.g., 8~10 minutes later based on the state of FIG. 15 (b)), as shown in FIG. 15 (c), a screen 1512 is transformed to be exposed to a minimum, and the volume is controlled to a zero state 1522. This is because the probability that the user is sleeping is very high.

Figure 16:
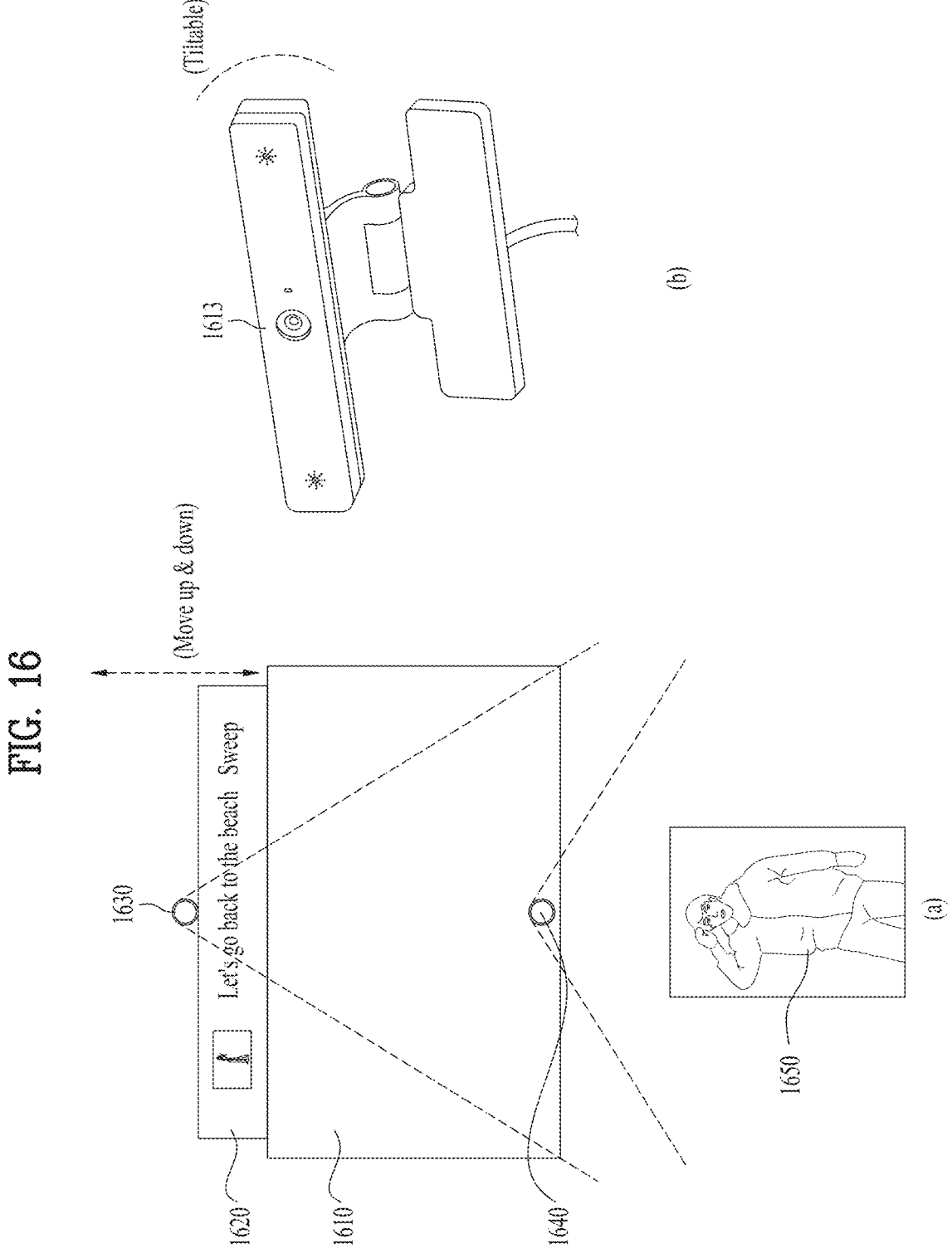
FIG. 16 is a diagram illustrating a process for differently adjusting a camera installed on a TV for each view mode according to an embodiment of the present disclosure.

FIG. 16 is a diagram showing a process of differently adjusting a camera installed in a TV for each view mode according to an embodiment of the present disclosure.

As shown in FIG. 16 (a), since a motion sensor 1640 for detecting a user 1650 is installed in a cover 1610 and a position of the cover 1610 is fixed, a position of the motion sensor 1640 also does not change within the cover 1610.

On the other hand, a screen 1620 of a TV according to an embodiment of the present disclosure frequently moves in up/down direction, and thus an absolute height of a camera 1630 located at the top of the screen 1620 changes from time to time.

Therefore, when the camera 1630 is fixed, it is difficult to accurately detect a face or movement of a user around the TV, and a problem of limiting a photographing range is expected.

To solve this problem, as shown in FIG. 16 (b), a camera 1631 is designed to be automatically tilted depending on a size (or full/partial view mode, etc.) of the exposed screen 1620.

More specifically, an optimal angle of the camera is stored depending on whether it is a full view mode or a partial view mode on initial setting (e.g., considering a main viewing location, distance, adaptive angle, etc.).

And, as the exposed screen size varies, the angle of the camera is automatically changed. To implement this, camera angle information according to the view mode is designed to be previously stored in a memory of the TV.

Furthermore, according to another embodiment of the present disclosure, a camera angle is primarily determined according to a view mode using information stored in a memory, and the camera angle is additionally and secondarily corrected in consideration of a position of a user detected by a motion sensor. That is, the secondary additional correction is a fine correction, and is set smaller than a range of adjusting the camera angle primarily, which is another feature of the present disclosure.

Alternatively, it is designed to improve user recognition processing speed as much as possible by designing the camera angle to be set in advance before a view mode is finally changed, which is another technical effect of the present disclosure.

On the other hand, although not shown in the drawing, it is also possible to adjust a volume or microphone sensitivity depending on a position of a user who is speaking.

The present disclosure may be embodied as a computer-readable code on a medium in which a program is recorded. The computer-readable medium includes all kinds of recording devices for storing data that can be read by a computer system. Examples of the computer readable medium include Hard Disk Drive (HDD), Solid State Disk (SSD), Silicon Disk Drive (SDD), ROM, RAM, CD-ROM, magnetic tape, floppy disk, optical data storage device, and the like and may also be implemented in the form of carrier waves (e.g. transmission over the Internet). The computer may also include a controller. Accordingly, the foregoing detailed description should not be construed as being limited in all respects and should be considered to be illustrative. The scope of the present disclosure should be determined by the reasonable interpretation of the appended claims, and all changes within the equivalent scope of the present disclosure are included in the scope of the present disclosure.

MODE FOR DISCLOSURE

Various embodiments of the present disclosure have been described in "Best Mode" which is the previous content, and it should be appreciated to combine the embodiments described in two or more figures by those skilled in the art as needed belongs to the scope of the present disclosure.

INDUSTRIAL APPLICABILITY

The present disclosure is applicable to TVs of various form factors such as a rollable TV and the like, and thus is industrially applicable.

What is claimed is:
1. A method of controlling a TV having a variable size of an exposed screen, the method comprising:
   identifying at least one user;
   changing a size of the exposed screen according to information of the identified user by referring to a memory; and
   controlling a video displayed on the exposed screen by referring to the memory,
   wherein the method further comprises:
   based on meeting both a first condition of failing to detect a motion change of the identified user and a second condition of failing to detect pupils of the identified user, changing an exposed size of the screen to a minimum value and gradually decreasing an output of audio data.

2. The method of claim 1, wherein the identifying uses identification information received from a mobile device connected to the TV through wireless communication or face recognition information detected through a camera installed in the TV.

3. The method of claim 1, wherein the controlling increases a size of a text included in the video in proportion to age information of the identified user.

4. The method of claim 1, further comprising:
   primarily adjusting a camera installed in the TV within a first range according to the size of the exposed screen; and
   secondarily adjusting the camera installed in the TV within a second range according to a position of the identified user.

5. The method of claim 4, wherein the first range is greater than the second range.

6. A TV having a variable size of an exposed screen, the TV comprising:
   a memory;
   a camera identifying at least one user; and
   a controller configured to change a size of the exposed screen according to information of the identified user and control a video displayed on the exposed screen by referring to the memory,
   wherein based on meeting both a first condition of failing to detect a motion change of the identified user and a second condition of failing to detect pupils of the identified user, the controller is configured to change the size of the exposed screen to a minimum value and gradually decrease an output of audio data.

7. The TV of claim 6, wherein the controller additionally uses identification information received from a mobile device connected to the TV through wireless communication.

8. The TV of claim 6, wherein the controller increases a size of a text included in the video in proportion to age information of the identified user.

9. A TV having a variable size of an exposed screen, the TV comprising:
   a memory;
   a camera identifying at least one user; and
   a controller configured to change a size of the exposed screen according to information of the identified user and control a video displayed on the exposed screen by referring to the memory,
   wherein the controller is configured to primarily adjust the camera within a first range according to the size of the exposed screen and secondarily adjust the camera within a second range according to a position of the identified user.

10. The TV of claim 9, wherein the first range is greater than the second range.

* * * * *